United States Patent [19]

Dickson et al.

[11] Patent Number: 6,160,902
[45] Date of Patent: *Dec. 12, 2000

[54] METHOD FOR MONITORING NITROGEN STATUS USING A MULTI-SPECTRAL IMAGING SYSTEM

[75] Inventors: Monte Andre Dickson; Larry Lee Hendrickson, both of Naperville; John F. Reid, Champaign, all of Ill.

[73] Assignee: Case Corporation, Del.

[*] Notice: This patent issued on a continued prosecution application filed under 37 CFR 1.53(d), and is subject to the twenty year patent term provisions of 35 U.S.C. 154(a)(2).

[21] Appl. No.: 08/948,637

[22] Filed: Oct. 10, 1997

[51] Int. Cl.$^7$ .................................................... G06K 9/00
[52] U.S. Cl. .......................... 382/110; 382/164; 348/144; 47/58.1
[58] Field of Search .................................... 382/110, 286, 382/164; 348/144; 47/1.01 R, 58.1

[56] References Cited

U.S. PATENT DOCUMENTS

| | | |
|---|---|---|
| H780 | 5/1990 | Hartman . |
| Re. 31,023 | 9/1982 | Hall, III . |
| 2,446,874 | 8/1948 | Geffner et al. . |
| 3,504,975 | 4/1970 | White . |
| 3,702,735 | 11/1972 | Potter, Jr. . |
| 3,822,098 | 7/1974 | Rudder et al. . |
| 3,829,218 | 8/1974 | Alyanak . |
| 3,927,400 | 12/1975 | Knepler . |
| 3,978,324 | 8/1976 | Rayner . |
| 3,984,671 | 10/1976 | Fletcher et al. . |
| 4,134,683 | 1/1979 | Goetz et al. . |
| 4,170,987 | 10/1979 | Anselmo et al. . |
| 4,227,211 | 10/1980 | Disbrow . |
| 4,560,275 | 12/1985 | Goetz . |
| 4,560,279 | 12/1985 | Kouns . |
| 4,599,001 | 7/1986 | Richard . |
| 4,963,742 | 10/1990 | Abernathy . |
| 4,974,209 | 11/1990 | Hoult . |
| 5,044,756 | 9/1991 | Gaultney et al. . |
| 5,072,128 | 12/1991 | Hayano et al. . |
| 5,132,802 | 7/1992 | Osthues et al. . |
| 5,144,767 | 9/1992 | McCloy et al. . |
| 5,222,324 | 6/1993 | O'Neall et al. . |
| 5,246,164 | 9/1993 | McCann et al. . |
| 5,255,081 | 10/1993 | Miyamoto et al. . |

(List continued on next page.)

FOREIGN PATENT DOCUMENTS

| | | | |
|---|---|---|---|
| 2244883 | 12/1991 | United Kingdom | .................. 382/110 |
| 96/12401 | 5/1996 | WIPO | ............................ A01G 25/16 |

OTHER PUBLICATIONS

Filella et al. "Evaluating wheat nitrogen status with canopy reflectance indeces and discriminant analysis" Crop Sci. vol. 35 pp. 1400–1405, Sep. 1995.

Hong et al. "Remote sensing for estimating chlorophyll amount in rice canopies" Geoscience and Remote Sensing, 1997. IGARSS' 97 pp. 89–91, Aug. 1997.

Heege et al. "Sensor for on the go control of site specific nitrogen top dressing" ASAE Annual International Meeting Jul. 1996.

Primary Examiner—Amelia Au
Assistant Examiner—Jingge Wu
Attorney, Agent, or Firm—Foley & Lardner

[57] ABSTRACT

A multi-spectral imaging system and method for producing an image is disclosed. More specifically, the imaging system produces an image of vegetation for analysis of crop characteristics, such as nitrogen levels, from an area having vegetation and a non-vegetation background. A light sensing unit detects light reflected at multiple wavelengths. The image is segmented into images at different wavelengths such as at the red, green and near infrared wavelengths. The images are combined into a multi-spectral image and segmented into a vegetation image by eliminating all non-vegetation images by using the images at two wavelengths. The vegetation image is analyzed for nitrogen levels by calculating reflectance values at the green wavelength. The images may be stored for further analysis of crop characteristics.

24 Claims, 4 Drawing Sheets

U.S. PATENT DOCUMENTS

| | | |
|---|---|---|
| 5,278,423 | 1/1994 | Wangler et al. . |
| 5,280,685 | 1/1994 | Turner . |
| 5,296,702 | 3/1994 | Beck et al. . |
| 5,315,564 | 5/1994 | Upton . |
| 5,348,002 | 9/1994 | Caro . |
| 5,353,052 | 10/1994 | Nishioka et al. . |
| 5,353,053 | 10/1994 | Nishioka et al. . |
| 5,371,358 | 12/1994 | Chang et al. . |
| 5,381,624 | 1/1995 | Davis et al. . |
| 5,389,781 | 2/1995 | Beck et al. . |
| 5,412,219 | 5/1995 | Chappelle et al. . |
| 5,467,271 | 11/1995 | Abel et al. . |
| 5,479,255 | 12/1995 | Denny et al. . |
| 5,488,479 | 1/1996 | Williams et al. . |
| 5,569,842 | 10/1996 | Silvestri . |
| 5,606,821 | 3/1997 | Sadjadi et al. . |
| 5,764,819 | 6/1998 | Orr et al. ............... 382/110 |
| 5,878,356 | 3/1999 | Garrot et al. ............ 348/144 |
| 5,924,239 | 7/1999 | Rees et al. ............... 47/1.7 |

METHOD FOR MONITORING NITROGEN STATUS USING A MULTI-SPECTRAL IMAGING SYSTEM

FIELD OF INVENTION

This invention relates to an apparatus and method for producing a multi-spectral image of selected objects in an area and more specifically, to an apparatus and method for using a multi-spectral sensor which detects light reflected at multiple wavelengths from an area having vegetation and non-vegetation to produce a vegetation image for analysis of characteristics such as nitrogen.

BACKGROUND OF INVENTION

Monitoring of crops in agriculture is necessary to determine optimal growing conditions to improve and maximize yields. Maximization of crop yields is critical to the agricultural industry due to the relatively low profit margins involved. Crop conditions in a particular field or area are analyzed for factors such as plant growth, irrigation, pesticides etc. The results of the analyses may be used to identify planting problems, estimate yields, adjust irrigation schedules and plan fertilizer application. The status of the crops is monitored throughout the growing cycle in order to insure that maximum crop yields may be achieved.

Optimum crop development requires maintenance of high levels of both chlorophyll and nitrogen in plants. As it is known that plant growth correlates with chlorophyll concentration, finding of low chlorophyll concentration levels is indicative of slower growth and ultimately a yield loss. Since there is a direct relationship between the nitrogen and chlorophyll levels in plants, a finding of low chlorophyll may signal the existence of low levels of nitrogen. Thus, in order to improve crop growth, farmers add nitrogen fertilizers to the soil to increase chlorophyll concentration and stimulate crop growth. Fertilizer treatments, if applied early in the crop growth cycle, can insure that slower growing crops achieve normal levels of growth.

Monitoring nitrogen levels in crops, vis-a-vis chlorophyll levels, allows a farmer to adjust application of fertilizer to compensate for shortages of nitrogen and increase crop growth.

Accurate recommendations for fertilizer nitrogen are desired to avoid inadequate or excessive application of nitrogen fertilizers. Excessive amounts of fertilizer may reduce yields and quality of certain crops. Additionally, over application of fertilizer results in added costs to a farmer, as well as increasing the potential for nitrate contamination of the environment. Thus, it is critical to obtain both accurate and timely information on nitrogen levels.

One known method of determining the nitrogen content in plants and soil involves taking samples of plants and soil and performing chemical testing. However this method requires considerable time and repeated sampling during the growing season. Additionally, a time delay exists from the time the samples are taken to the time when the nitrogen levels are ascertained and when fertilizer may be applied due to the time required for laboratory analysis. Such delay may result in the delayed application of corrective amounts of fertilizer, which may then be too late to prevent stunted crop growth.

In an effort to eliminate the delay between the times of nitrogen measurement and the application of corrective fertilizer, it has been previously suggested to utilize aerial or satellite photographs to obtain timely data on field conditions. This method involves taking a photograph from a camera mounted on an airplane or a satellite. Such photos are compared with those of areas which do not have nitrogen stress. Such a method provides improvement in analysis time but is still not real time. Additionally it requires human intervention and judgment. Information about crop status is limited to the resolution of the images. When such aerial images are digitized, a single pixel may represent an area such as a square meter. Insufficient resolution prevents accurate crop assessment. Other information which might be gleaned from higher resolution images cannot be measured.

Another approach uses a photodiode mounted on ground based platforms to monitor light reflected from a sensed area. The image is analyzed to determine the quantity of light reflected at specific wavelengths within the light spectrum of the field of view. Nitrogen levels in the crops have been related to the amount of light reflected in specific parts of the light spectrum, most notably the green and near infrared wavelength bands. Thus, the reflectance of a crop may be used to estimate the nitrogen for the plants in that crop area.

In contradistinction, however, the photodiode sensing methods suffer from inaccuracies in the early part of the crop growth cycle because the overall reflectance values are partially derived from significant areas of non-vegetation backgrounds, such as soil, which skew the reflectance value and hence the nitrogen measurements. Additionally, since one value is used, this method cannot account for deviations in reflectance readings due to shadows, tassels and row orientation of the crops.

Increasing spatial and spectral resolution can produce a more accurate image, which provides improved reflectance analysis as well as being able to differentiate individual rows or plants. However, current high resolution remote sensing approaches have met with little success because of the tremendous volumes of data generated when used over large areas at the necessary high resolutions. These methods are difficult to implement because of the large amount of data which must be stored or transferred for each image.

Thus a need exists for an image sensor which is capable of producing crop images which may be analyzed in real time for substances such as nitrogen. Furthermore, there is a need for an image sensor which accurately analyzes nitrogen content in crops independent of the stage of crop growth. Also, there is a need for a sensor which can isolate vegetation regions from an image comprising vegetation and non-vegetation areas for analysis. There is also a need for an image sensor which can determine amounts of nitrogen in discrete areas of an imaged crop area such as for a particular row. Also, there is a need for a sensor which can produce and store images of crop areas for later analysis. There is a need for an image sensor which can correct for the effects of variable ambient light on reflectance. Finally, a system is desired which may be calibrated to provide accurate prediction of additional nitrogen fertilizer required for optimum yields.

SUMMARY OF THE INVENTION

The present invention is embodied in an imaging system for analyzing an image of vegetation from an area having vegetation and a non-vegetation background. The imaging system includes an light receiving unit for receiving light reflected from the vegetation and non-vegetation background at a plurality of wavelength ranges. A multi-spectral sensor is coupled to the light receiving unit to produce an image of the vegetation and non-vegetation based on the light reflected at the plurality of wavelength ranges. An image processor is coupled to the multi-spectral sensor to produce a vegetation image by separating the non-vegetation portion of the image from the vegetation portion of the image as a function of light reflected at a first wavelength range. A means for analyzing the vegetation image to determine crop characteristics of the vegetation is coupled to the image processor. The crop characteristics of the vegetation may include nitrogen levels which may be used to control corrective fertilizer treatments.

The present invention is further embodied in a method for determining crop characteristics in an area with vegetation and non-vegetation. First, light reflected from the area at a plurality of wavelength ranges is sensed. An image is formed based on the sensed light at the plurality of wavelength ranges. A vegetation image is separated from the image by analyzing light reflected at a first wavelength range. The light reflected by the vegetation image is determined at a third wavelength range. Crop characteristics are calculated in the vegetation image. This information may be used to determine nitrogen status of the vegetation.

It is to be understood that both the foregoing general description and the following detailed description are not limiting but are intended to provide further explanation of the invention claimed. The accompanying drawings, which are incorporated in and constitute part of this specification, are included to illustrate and provide a further understanding of the method and system of the invention. Together with the description, the drawings serve to explain the principles of the invention.

DESCRIPTION OF THE PREFERRED EMBODIMENT

While the present invention is capable of embodiment in various forms, there is shown in the drawings and will hereinafter be described a presently preferred embodiment with the understanding that the present disclosure is to be considered as an exemplification of the invention, and is not intended to limit the invention to the specific embodiment illustrated.

Figure 1:
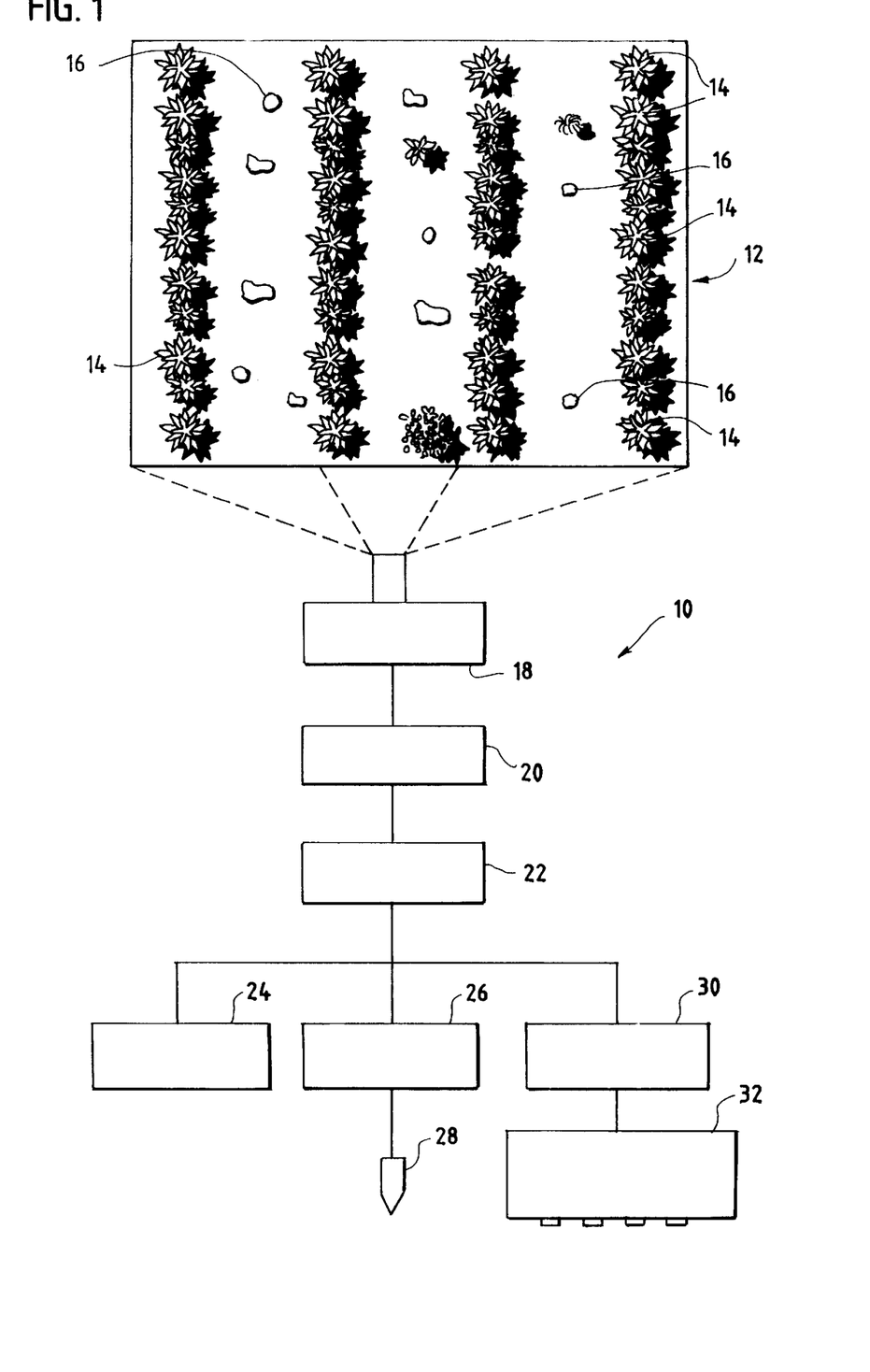
FIG. 1 is a block diagram of an imaging system according to the present invention.

FIG. 1 shows a block diagram of an imaging system 10 which embodies the principles of the present invention. The imaging system 10 produces an image of vegetation from an area 12 having vegetation 14 and a non-vegetation background 16. The area 12 may be a field of any dimension in which analysis of the vegetation 14 for crop growth characteristics is desired. The present imaging system 10 is directed toward determination of nitrogen levels in the vegetation 14, although other crop growth characteristics may be determined as will be explained below.

The vegetation 14 are typically crops which are planted in rows or other patterns in the area 12. The vegetation 14 in the preferred embodiment includes all parts of the crops such as the green parts of crops which are exposed to light, non-green parts of crops such as corn tassels and green parts which are not exposed to light (shadowed). In certain applications of the preferred embodiment such as nitrogen characterization, the images of vegetation 14 will only include green parts of crops which are exposed to light particularly direct light. Other plant parts are not considered parts of the vegetation 14 which will be imaged. Other applications such as crop canopy analysis will include all parts of the crops as the image of vegetation 14.

The imaging system 10 has a light receiving unit 18 which detects light reflected from the vegetation 14 and the non-vegetation background 16 at a plurality of wavelength ranges. In the preferred embodiment, the light receiving unit 18 senses light reflected in three wavelength ranges, near infrared, red and green. The optimal wavelengths for crop characterization are green in the wavelength range of 550 nm (+/−20 nm), red in the wavelength range of 670 nm (+/−40 nm) and near infrared in the wavelength range of 800 nm (+/−40 nm). Of course, different bandwidths may be used. Additionally, the specific optimized wavelengths may depend on the type of vegetation being sensed.

The size of the area of view of the area 12 depends on the proximity of the imaging system 10 to the area 12 and the focal length of light receiving unit 18. A more detailed image may be obtained if the system 10 is in closer proximity to the area 12 and or a smaller focal length lens is used. In the preferred embodiment, the imaging system 10 is mounted on a stable platform such as a tractor and the area of view is approximately 20 by 15 feet.

Larger areas of land may be imaged if the system 10 is mounted on an aerial platform such as an airplane, helicopter or a satellite. When the system 10 is mounted on an aerial platform a larger imaging array may be used in order to capture large areas with sufficient spatial and spectral resolution. Alternatively, several small images of a large area can be combined into an image map when used in conjunction with global positioning system (GPS) data.

Light receiving unit 18 is coupled to a multi-spectral sensor 20 to produce a multi-spectral image of the vegetation and non-vegetation based on the light reflected at the various wavelength ranges. An image processor 22 is coupled to the multi-spectral sensor 20 to produce a vegetation image by separating the non-vegetation portion from the vegetation portion of the multi-spectral image as a function of light reflected at the first wavelength range (near infrared) and light reflected at the second wavelength range (red).

The vegetation image is analyzed based on the third wavelength range (green). The image processor 22 includes a program for analyzing the vegetation image to determine the nitrogen status of the crop. This analysis may convert the observed reflectance levels to determine the amount of a substance such as nitrogen or chlorophyll in the vegetation and the amount of crop growth. Alternatively, one wavelength range may be used for both separating the non-vegetation portion from the vegetation portion as well as performing analysis on the vegetation image.

A storage device 24 is coupled to the image processor 22 for storing the vegetation image. The storage device 24 may be any form of memory device such as random access memory (RAM) or a magnetic disk. A geographic information system (GIS) 26 is coupled to the storage device 24 and serves to store location data with the stored vegetation images. Geographic information system 26 is coupled to a geographic position sensor 28 which provides location data. The position sensor 28, in the preferred embodiment, is a global positioning system receiver although other types of position sensors may be used.

The geographic information system 26 takes the location data and correlates the data to the stored image. The location data may be used to produce a crop map which indicates the location of individual plants or rows. The location data may be also used to produce a vegetation map. Alternatively, if the system 10 is mounted aerially, the location data may be used to assemble a detailed vegetation map using smaller images.

The image processor 22 may also be coupled to a corrective nitrogen application controller 30. Since the above analysis may be performed in real time, the resulting data may be used to add fertilizer to areas which do not have sufficient levels of nitrogen as the sensor system 10 passes over the deficient area. The controller 30 is connected to a fertilizer source 32. The controller 30 uses the information regarding nitrogen levels in the vegetation 14 from image processor 22 and determines whether corrective nitrogen treatments in the form of fertilizer are necessary. The controller 30 then applies fertilizer in these amounts from the fertilizer source 32. The fertilizer source includes any fertilizer application device including those pulled by tractor or self propelled. The fertilizer source may also be applied using irrigation systems.

Figure 2:
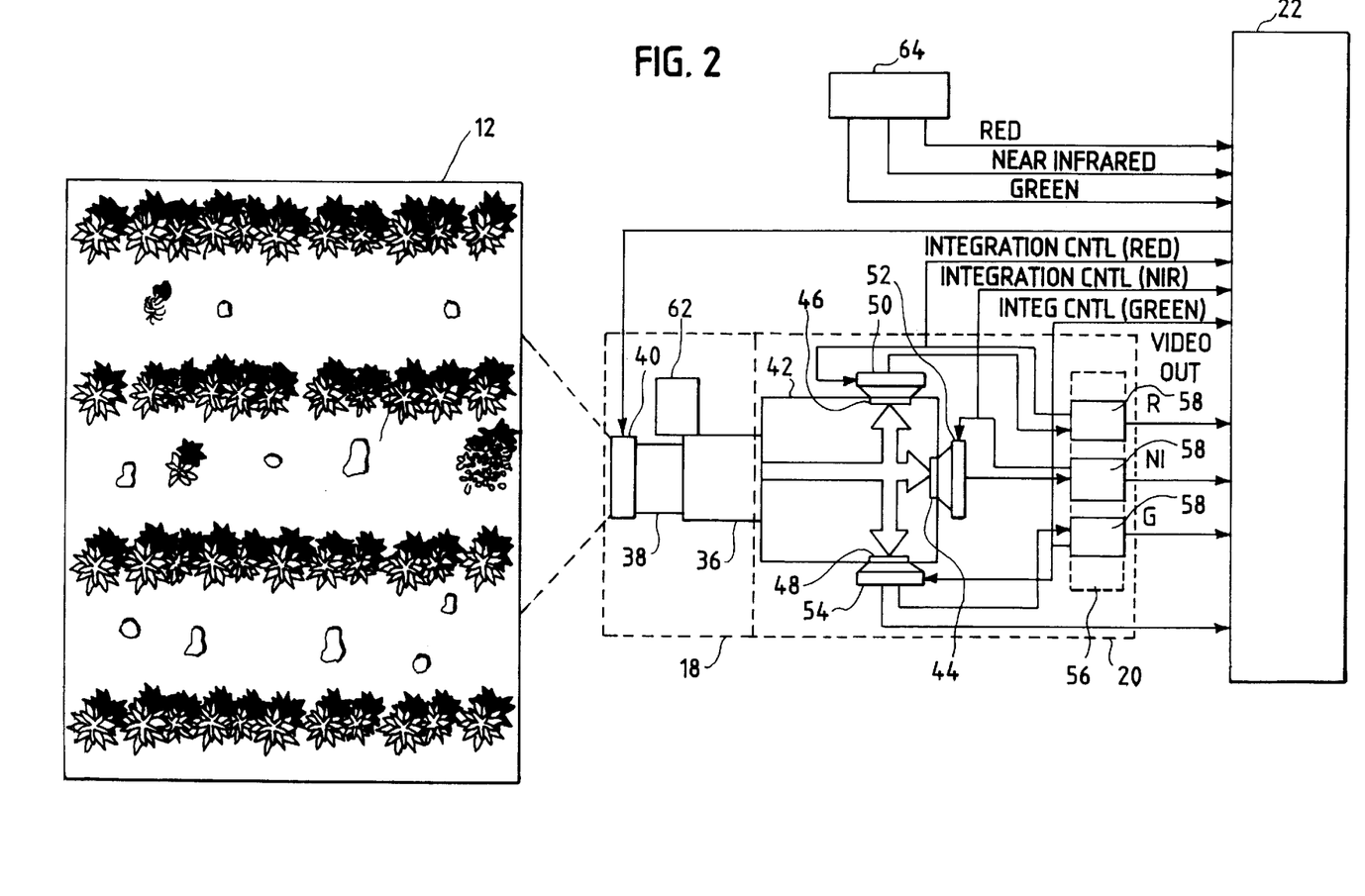
FIG. 2 is a block diagram of the components of the multi-spectral sensor and the light receiving circuit according to the present invention.

FIG. 2 shows the components of the light receiving unit 18, the multi-spectral sensor 20, and the image processor 22. The light receiving unit 18 in the preferred embodiment has a front section 36, a lens body 38 and an optional section 40 for housing an electronic iris. The electronic iris may be used to control the amount of light exposed to the multi-spectral sensor 20. The scene viewed through the lens 38 of the area 12 is transmitted to a prism box 42. The prism box 42 splits the light passing through the lens 38 to a near infrared filter 44, a red filter 46 and a green filter 48. Thus the light passed through the lens 38 is broken up into light reflected at each of the three wavelengths. The light at each of the three wavelengths from the prism box 42 is transmitted to other components of the multi-spectral sensor 20.

The multi-spectral sensor 20 contains three charge coupled device (CCD) arrays 50, 52 and 54. The light passes through near infrared filter 44, red filter 46, and green filter 48 then is radiated upon charge coupled device (CCD) arrays 52, 50, and 54, respectively. The CCD arrays 50, 52 and 54 convert photon to electron energy when they are charged in response to signals received from integrated control circuits 58, described below. The CCD arrays 50, 52 and 54 may be exposed to light for individually varying exposure period by preventing photon transmission after a certain exposure duty cycle.

The CCD arrays 50, 52 and 54 convert the scene viewed through the lens 38 of the vegetation 14 and non-vegetation 16 of the area 12 into a pixel image corresponding to each of the three wavelength ranges. The CCD arrays 50, 52 and 54 therefore individually detect the same scene in three different wavelength ranges: red, green and near infrared ranges in the preferred embodiment. Accordingly, multi-spectral sensor 20 is adapted to provide two or more images in two or more wavelength bands or spectrums, and each of the images are taken by the same scene by light receiving unit 18.

In the preferred embodiment, each of the CCD arrays 50, 52 and 54 have 307,200 detector elements or pixels which are contained in 640×480 arrays. Each detector element or pixel in the CCD arrays 50, 52 and 54 is a photosite where photons from the impacting light are converted to electrical signals. Each photosite thus produces a corresponding analog signal proportional to the amount of light at the wavelength impacting that photosite.

While the CCD arrays preferably have a resolution of 640 by 480 pixels, arrays having a resolution equal to or greater than 10 by 10 pixels may prove satisfactory depending upon the size of the area to be imaged. Larger CCD arrays may be used for greater spatial or spectral resolution. Alternatively, larger areas may be imaged using larger CCD arrays. For example, if the system 10 is mounted on an airplane or a satellite, an expanded CCD array may be desirable.

Each pixel in the array of pixels receives light from only a small portion of the total scene viewed by the sensor. The portion of the scene from which each pixel receives light is that pixel's viewing area. The size of each pixel's viewing area depends upon the pixel resolution of the CCD array of which it is a part, the optics (including lens 38) used to focus reflected light from the imaged area to the CCD array, and the distance between unit 18 and the imaged areas. For particular crops, there are preferred pixel viewing areas and system 10 should be configured to provide that particular viewing area. For crops such as corn and similar leafy plants, when the system is used to measure crop characteristics at later growth stages, the area in the field of view of each pixel should be less than 100 square inches. More preferably, the area should be less than 24 square inches. Most preferably, the area should be less than 6 square inches. For the same crops at early growth stages, the area in the field of view of each pixel should be no more than 24 square inches. More preferably, the area should be no more than 6 square inches, and most preferably, the area should be no more than 1 square inch.

CCD arrays 50, 52 and 54 are positioned in multi-spectral sensor 20 to send the analog signals generated by the CCD arrays representative of the green, red and near infrared radiation to a sensor control circuit 56 (electronically coupled to the CCD arrays) which converts the three analog signals into three video signals (red, near infrared and green) representative of the red, near infrared and green analog signals, respectively. The video signals are transmitted to the image processor 22. The data from these signals is used for analysis of crop characteristics of the imaged vegetation, i.e. vegetation 14 in the area 12. If desired, these signals may be stored in storage device 24 for further processing and analysis.

Sensor Control Circuit 56 includes three integration control circuits 58 which have control outputs coupled to the CCD arrays 50, 52 and 54 to control the duty cycle of the pixels' collection charge and prevent oversaturation and/or the number of pixels at noise equivalent level of the pixels in the CCD arrays 50, 52 and 54. The noise equivalent level is the CCD output level when no light radiates upon the light-receiving surfaces of a CCD array. Such levels are not a function of light received, and therefore are considered noise. One or more integration control circuits 58 include an input coupled to the CCD array 54. The input measures the level of saturation of the pixels in CCD array 54 and the integration control circuit 58 determines the duty cycle for all three CCD arrays 50, 52 and 54 based on this input. The green wavelength light detected by CCD array 54 provides the best indication of oversaturation of pixel elements.

The exposure time of the CCD arrays 50, 52 and 54 is typically varied between one sixtieth and one ten thousandth of a second in order to keep the CCD dynamic range below the saturation exposure but above the noise equivalent exposure. Alternatively, the duty cycle for the other two CCD arrays 50 and 52 may be determined independently of the saturation level of CCD array 54. This may be accomplished by separate inputs to integration control circuits 58 and separate control lines to CCD arrays 50 and 52.

One or more integration control circuits 58 may also control the electronic iris of section 40. The electronic iris of section 40 has a variable aperture to allow more or less light to be passed through to the CCD arrays 50, 52 and 54 according to the control signal sent from at least one integration control circuit 58. Thus, the exposure of the CCD arrays 50, 52 and 54 may be controlled by the iris 40 to shutter light or the duty cycle of the pixels or a combination depending on the application.

The analog signals are converted into digital values for each of the pixels for each of the three images at green, red and near infrared. These digital values form digital images that are combined into a multi-spectral image which has a green, red and near infrared value for each pixel. The analog values of each pixel may be digitized using, for example, an 8 bit analog to digital converter to obtain reflectance values (256 colors) at each wavelength for each pixel in the composite image, if desired. Of course, higher levels of color resolution may be obtained with a 24 bit analog to digital converter (16.7 million colors).

The light receiving unit 18 can also include a light source 62 which illuminates the area 12 of vegetation 14 and non-vegetation 16 sensed by the light receiving unit 18. The light source 62 may be a conventional lamp which generates light throughout the spectrum range of the CCD arrays. The light source 62 is used to generate a consistent source of light to eliminate the effect of background conditions such as shade, clouds etc. on the ambient light levels reaching the area 12.

Additionally, the imaging system 10 can include an ambient light sensor 64. The ambient light sensor 64 is coupled to the image processing circuit 22 and provides three output signals representative of the ambient red, near infrared and green light, respectively, around the area 12. The output of the ambient light sensor 64 may be used to quantify reflectance measurement in environments in which the overall light levels change. In particular, the output of the ambient light sensor may be used to enable correction of the observed reflectance to account for changes in ambient light. A change in reflectance may be caused either by a change in the vegetation characteristics or to a change in ambient light intensity. Although primary control of CCD duty cycle is based upon direct CCD response, the processing circuit 22 may control the integration control circuits 58 to adjust the exposure time of the CCD arrays 50, 52 and 54 to changes in reflectance and therefore maintain the output within a dynamic range.

Figure 3:
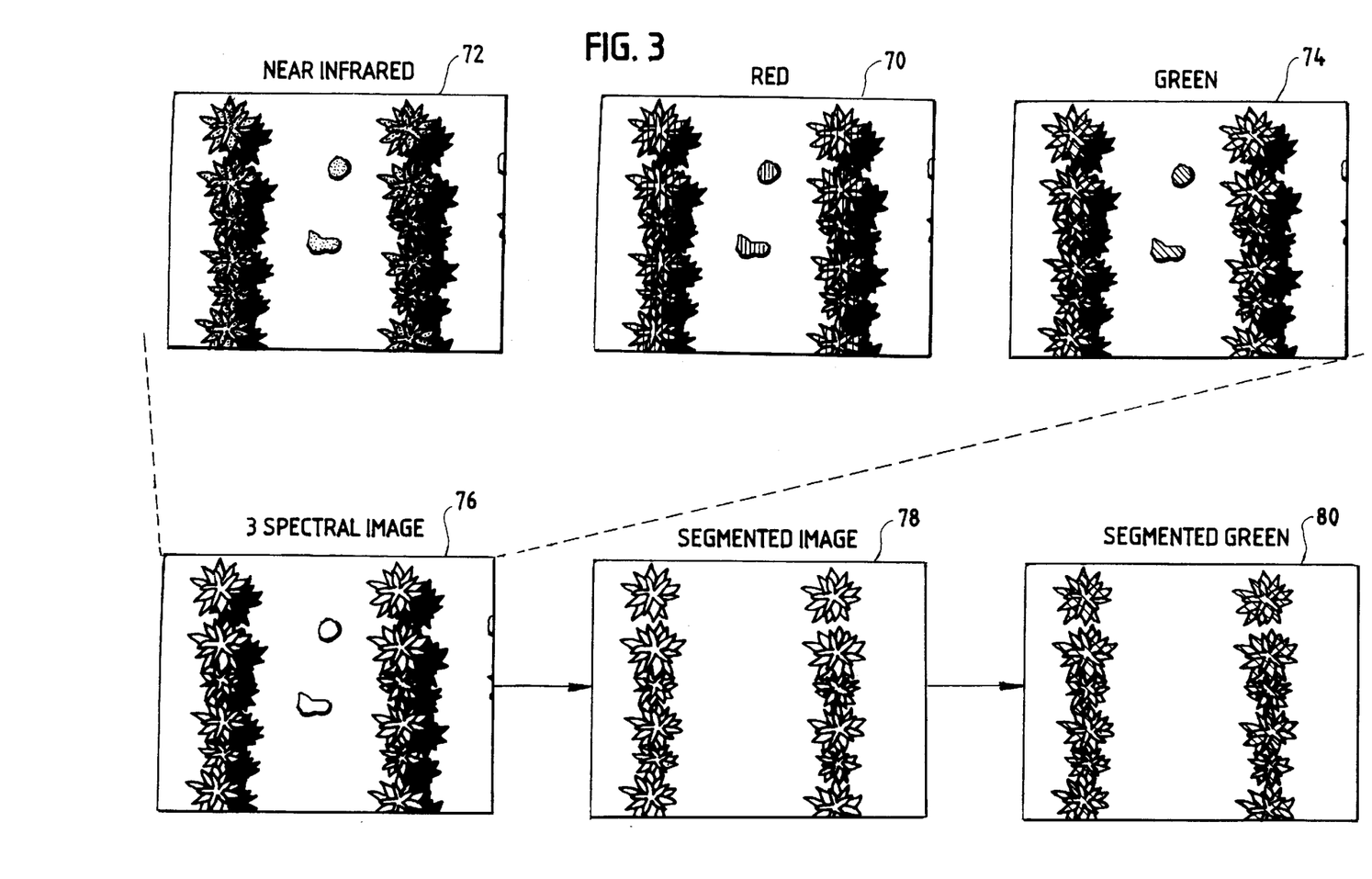
FIG. 3 is a diagram of the images which are processed for the vegetation image according to the present invention.

The operation and analysis procedure of the imaging system 10 will now be explained with reference to FIGS. 1–4. The imaging system 10 is used to determine crop characteristics. The imaging system 10 first senses light reflected from the vegetation 14 and the non-vegetation 16 of the area 12 at a plurality of wavelength ranges using the light receiving unit 18 as described above. The light receiving unit 18 separates the light reflected from the area 12 into a plurality of wavelength ranges. As explained above, there are three wavelengths and images are formed for light reflected at each of the wavelengths. As FIG. 3 shows, a red image 70, a near infrared image 72, and a green image 74 are formed from the CCD arrays 50, 52 and 54, respectively, of the multi-spectral sensor 20.

After the light is sensed at the three wavelength ranges, a multi-spectral image 76 is formed based on the sensed light at the plurality of wavelength ranges by the image processing circuit 22. The multi-spectral image 76 is a combination of the three separate images 70, 72 and 74 at the red, near infrared and green wavelengths. A vegetation image 78 is obtained from the multi-spectral image 76 by analyzing light reflected at a first wavelength range and light reflected at the second wavelength range. Light reflected by the vegetation image 78 is determined at the third wavelength range to form a green vegetation image 80. Alternatively, the vegetation image 78 may be obtained by analyzing light reflected at a first wavelength range alone.

The quantity of a substance in the vegetation 14 is determined as a function of the light reflected by the vegetation image 78 at the third wavelength range such as the green vegetation image 80. Light reflectance in the visible spectrum (400–700 nm) increases with nitrogen deficiency in vegetation. Thus, sensing light reflectance allows a determination of the nitrogen in vegetation areas. Alternatively, the quantity of a substance such as nitrogen may be determined as a function of the light reflected by the vegetation image 78 at the first wavelength range alone.

Thus, the individual images 70, 72 and 74 at each of the three wavelengths may be combined to make a single multi-spectral image 76 by the image processing circuit 22 or may be transmitted or stored separately in storage device 24 for further image processing and analysis. Additional processing 8 may be performed on the vegetation image 78 to further distinguish features such as individual plants, shaded areas etc. Alternatively, the present invention may be used with present images captured using color or color NIR film. Such film based images are then digitized to provide the necessary spatial resolution. Such digitization may take an entire image. Alternatively, a portion of an image or several portions of an image may be scanned to assemble a map from different segments.

The image processor 22 is used to enhance the multi-spectral image 76, compute a threshold value for the image and produce the vegetation image 78. The enhancement step is performed in order to differentiate the vegetation and non-vegetation images in the composite image. As explained above, for purposes of characterizing crop nitrogen status, the vegetation includes only the green parts of a plant which are exposed to light, while the non-vegetation includes soil, tassels, shaded parts of plants etc. Enhancement may be achieved by calculating an index using reflectance information from multiple wavelengths. The index is dependant on the type of feature which is desired to be enhanced. In the preferred embodiment, the vegetation features of the image are enhanced in order to perform crop analysis. However, other enhancements may include evaluation of soil, specific parts of plants etc.

The index value for image enhancement is calculated for each pixel in the multi-spectral image 76. The index value in the preferred embodiment is derived from a formula which is optimal for separating vegetation from non-vegetation i.e. soil areas. The preferred embodiment calculates a normalized difference vegetative index (NDVI) as an index value to separate the vegetation pixels from non-vegetation pixels. The NDVI index for each pixel is calculated by subtracting the red value from the near infrared value and dividing the result from the addition of the red value and the near infrared value. The vegetation image map is generated using the NDVI value for each pixel in the multi-spectral image.

A threshold value is computed based on the NDVI data for each pixel. An algorithm is chosen to compute a point that separates the vegetation areas from the non-vegetation areas.

This point is termed the threshold and may be calculated using a variety of different techniques. In the preferred embodiment a histogram of the NDVI values is calculated for all the pixels in the multi-spectral image. The NDVI values constitute a gray scale image composed of each of the pixels in the multi-spectral image.

Figure 4:
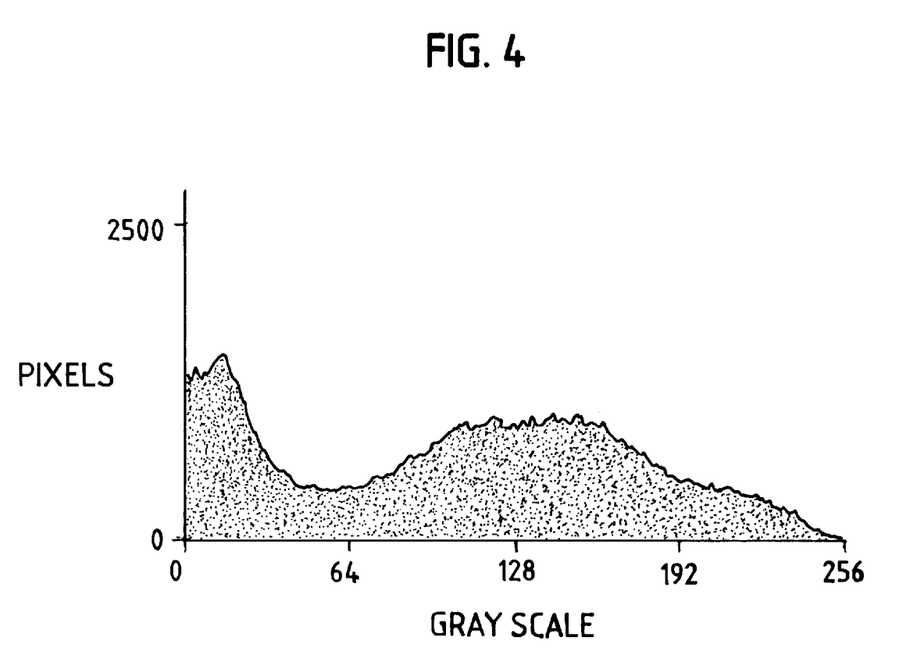
FIG. 4 is a histogram of pixel gray scale values used to segment vegetation and non-vegetation images according to the present invention.

The histogram representing an NDVI gray scale image for multi-spectral image 76 is shown in FIG. 4. The histogram in FIG. 4 demonstrates the normal binary distribution between the soil (<64 gray level) and vegetation (>64 gray level). The threshold value is then calculated by an algorithm which best computes the gray level that separates the vegetation from non-vegetation areas. In the preferred embodiment the mean value for the gray scale for all the pixels in the multi-spectral image 76 is calculated. The mean is modified by an offset value to produce the threshold value. The offset value is obtained from a look up table having empirically derived gray scale values for different vegetation and non-vegetation areas obtained under comparable conditions. In FIG. 4, the threshold value is computed near gray level 64. Each pixel's NDVI value is compared with the threshold value. If the NDVI value is below the threshold value, the pixel is determined to be non-vegetation and its reflectance values for all three wavelengths are set to zero which correspond to a black color. The pixels which have NDVI values above the threshold do not have their reflectance values altered. Thus, the resulting vegetation image 78 has only vegetation pixels representing the vegetation 14.

The image processor 22 then performs additional image analysis on the resulting vegetation image 78. The image analysis may be used to evaluate crop status in a number of ways. For example, plant nitrogen levels, plant population and percent canopy measurements may be characterized depending on how the vegetation image is filtered.

Crop nitrogen status may be estimated by the above described process since reflected green light is closely correlated with plant chlorophyll content and nitrogen concentration. Thus determination of the average reflected green light over a given region provides the nitrogen and chlorophyll concentration. In this case, the NDVI values are used to select pixels which represent the green parts of the plants which are exposed to light. The reflective index may be computed from an entire image or it may be computed for selected areas within each image. The reflective index is computed for each pixel of an image in the preferred embodiment.

The average green reflective index ($G_{avg\ n}$) values for a particular area is computed as follows.

$$G_{avg_n} = \Sigma G_n(x_c, y_c)$$

In this equation, $G_n$ is the green reflectance value for each of the individual pixels ($x_c$ and $y_c$) in the vegetation area, n, for which the reflectance index is calculated and $c_n$ is the total number of pixels in the vegetation area.

Crop nitrogen status can also be estimated for a selected area of the vegetation image by calculating the ratio of light intensity at the third wavelength band to light intensity at the first wavelength band. This ratio is indicative of the crop nitrogen status. This ratio may be calculated by taking the ratio of the pixel value of a pixel receiving light in the third wavelength band and dividing this by a pixel value of a pixel receiving light in the first wavelength band. Alternatively, several such ratios may be calculated and the average taken of these ratios. Alternatively, an average value of pixels in the third wavelength band may be determined and an average value of pixels in the first wavelength band may be determined. The average pixel value for the third wavelength band may then be divided by the average pixel value for the first wavelength band. If this process is performed to estimate the nitrogen status for a selected area of the image, only those pixels that form the selected area would be employed.

A normalized nitrogen status may be obtained by using a nitrogen classification algorithm. This algorithm uses the computed reflective index and also incorporates ambient light measurements from the ambient light sensor 64 and settings such as the duty cycle of arrays 50, 52 and 54. Including these non-vegetation parameters enables the system to correct for changes in observed reflectance due to ambient light levels and sensor system parameters.

Another corrective measure for vegetation factors involves sensing a reference strip of vegetation having a greater supply of nitrogen. This reference strip may consist of rows of plants which are given 10–20% more nitrogen than is typically recommended for the crop, thus insuring that the lack of nitrogen does not limit crop growth and chlorophyll levels. The reference plants are located at specific intervals depending on the regions or areas where the reflective indexes are to be calculated.

A reference reflectance value is calculated from the reference strip by the process described above. The reflective index of the other areas can be compared directly to the reference N reflectance value. Direct comparison of the crop reflectance at the green wavelength with reflectance from an adjacent reference strip will ensure that differences in observed reflectance are due solely to nitrogen deficiency and not to low light levels or other stress factors that may have impacted reflectance from the crop.

The system 10 may be used to compile a larger crop map of a field in which a crop is growing. To create this map, the system receives and stores a succession of individual images of the crop each taken at a different position in the field. The position sensor 28 is used to obtain location coordinates, substantially simultaneous to receiving each image, indicative of the location at which each of the images was received. The location coordinates are stored in a manner that preserves the relationship between each image and its corresponding location coordinates. As each vegetation image is processed it is combined with other vegetation images to form a vegetation map of a larger area.

Crop growth may also be determined by system 10. To provide this determination, a first image may be taken of the crop at a particular location and recorded. Subsequent images may be taken and recorded at varying time intervals, such as weekly, biweekly or monthly. The amount of crop growth over each such interval may then be determined by comparing the first recorded images with subsequent recorded images at the same location.

The stored vegetation images may be used for further analysis, such as to determine plant population. Additionally, in conjunction with the location data obtained from the position sensor 28, the positions of individual plants from the vegetation image may be determined. Further analysis may be performed by isolating an image of a specific row of vegetation. This analysis may be performed using the stored digital images and software tailored to enhance images.

The above identified data may then be used for comparison of crop factors such as tillage, genotype used and fertilizer effects.

It will be apparent to those skilled in the art that various modifications and variations can be made in the method and system of the present invention without departing from the spirit or scope of the invention. For example, the imaging sensor may be used in conjunction with soil property measurements such as type, texture, fertility and moisture analysis. Additionally, it may be used in residue measurements such as type or residue or percentage of residue coverage. Images can also be analyzed for weed detection or identification purposes.

The invention is not limited to crop sensing application such as nitrogen analysis. The light receiving unit and image processor arrangement may be used in vehicle guidance by using processed images to follow crop rows, recognize row width, follow implement markers and follow crop edges in tillage operations. The sonsor arrangement may also be used in harvesting by measuring factors such as grain tailings, harvester swath width, numbers of rows, cutter bar width or header width and monitoring factors such as yield, quality of yield, loss percentage, number of rows.

In other words, the reference strip of vegetation is provided with a non-limiting supply of nitrogen. The imaging system of the present invention may also be used to aid vision by providing rear or alternate views or guidance error checking. The system may also be used in conjunction with obstacle avoidance. Additionally, the system may be used to monitor operator status such as human presence or human alertness.

Thus, it is intended that the present invention cover modifications and variations that come within the scope of the spirit of the invention and the claims that follow.

What is claimed is:

1. An imaging system usable with a ground based vehicle for analyzing an image in real time of vegetation from an area having vegetation and a non-vegetation background, the imaging system comprising:
   a light receiving unit mounted on the ground-based vehicle for receiving light reflected from the vegetation and non-vegetation background at a plurality of wavelength ranges;
   an ambient light sensor mounted on the ground-based vehicle to quantify changes in ambient light intensity;
   a multi-spectral sensor mounted on the ground-based vehicle and coupled to the light receiving unit and the ambient light sensor to produce an image of the vegetation and non-vegetation based on the light reflected at the plurality of wavelength ranges;
   an image processor mounted on the ground-based vehicle and coupled to the multi-spectral sensor to produce a vegetation image by separating the non-vegetation portion of the image from the vegetation portion as a function of light reflected at a first wavelength and corrected for changes in ambient light intensity;
   a material application device configured to apply a fertilizer and coupled for movement with the vehicle;
   a means for analyzing the vegetation image to determine a nitrogen status of the crop-based on light reflected from the crop corrected for changes in ambient light intensity at a wavelength range in the green spectrum before the material application device has moved past the area; and
   a controller coupled to the material application device and the means for analyzing, wherein the controller is configured to determine corrective fertilizer treatments for the area based on the determined nitrogen status of the crop and to control the material application device to apply the corrective fertilizer treatments to the area.

2. The imaging system of claim 1 further comprising:
   a storage device coupled to the image analyzer for storing the vegetation image; and
   a geographic information system to produce location data corresponding to the stored vegetation images.

3. The imaging system of claim 2 further comprising a position sensor coupled to the geographic information system.

4. The imaging system of claim 3, wherein the position sensor is a global positioning system receiver.

5. The imaging system of claim 1 wherein the image processor produces a vegetation images by separating the non-vegetation portion of the image from the vegetation portion as a function of light reflected at a second wavelength range.

6. The imaging system of claim 5 wherein the first wavelength range is in the near infrared spectrum and the second wavelength range is in the red spectrum.

7. An image system for analyzing an image of vegetation from an area having vegetation and a non-vegetation background, the imaging system comprising:
   a light receiving unit for receiving light reflected from the vegetation and non-vegetation background at a plurality of wavelength ranges;
   an ambient light sensor to quantify ambient light intensity in the area;
   a multi-spectral sensor coupled to the light receiving unit and the ambient light sensor to produce an image of the vegetation and non-vegetation based on the light reflected at the plurality of wavelength ranges;
   an image processor coupled to the multi-spectral sensor to produce a vegetation image by separating the non-vegetation portion of the image from the vegetation portion as a function of light reflected at a first wavelength and corrected for changes in ambient light intensity; and
   a means for analyzing the vegetation image in real-time to determine crop characteristics, wherein the means for analyzing the vegetation image determines a nitrogen status of the vegetation based on light reflected from the vegetation at a third wavelength range in the green spectrum, the nitrogen status being based upon only green parts of the vegetation exposed to light in the vegetation image.

8. The imaging system of claim 7 wherein the light receiving unit, the ambient light sensor, the multi-spectral sensor and the processor are mounted on a vehicle.

9. The imaging system of claim 7 wherein the light receiving unit, the ambient light sensor, the multi-spectral sensor and the processor are mounted on an airplane.

10. The imaging system of claim 7 wherein the light receiving unit, the multi-spectral sensor and the processor are mounted on a satellite and the ambient light sensor remains on the ground.

11. A method usable on a ground-based vehicle coupled to a material application device for determining crop nitrogen status in real time for an area with vegetation and non-vegetation, the method comprising the steps of:
   sensing light reflected from the area at a plurality of wavelength ranges, the reflected light being sensed using a light receiving unit mounted on the vehicle;
   sensing ambient light intensity in the area at a plurality of wavelength ranges, the ambient light being sensed using an ambient light sensor mounted on a vehicle;
   forming an image based on the sensed light at the plurality of wavelength ranges, the image being formed using a multi-spectral sensor mounted on the vehicle;
   correcting the sensed light from the light receiving unit for changes in the ambient light intensity to maintain the sensed light in a dynamic range;

separating a vegetation image from the image by analyzing light reflected at a first wavelength range, the image being separated using an image processor mounted on the vehicle; and calculating crop nitrogen status in the vegetation image, the crop nitrogen status being calculated before the application device has moved past the area.

12. A method for determining crop nitrogen status in an area with vegetation and non-vegetation, the method comprising the steps of sensing light reflected from the area at a plurality of wavelength ranges;

sensing ambient light intensity changes in the area at a plurality of wavelength ranges;

forming an image based on the sensed light and connected for ambient light intensity changes at the plurality of wavelength ranges;

separating a vegetation image from the image by analyzing light reflected at a first wavelength range;

calculating crop nitrogen status in real-time for the vegetation image; and determining the light reflected by the vegetation image at a third wavelength range; and wherein the step of calculating crop nitrogen status includes determining the a nitrogen status of the vegetation as a function of the light reflected by the vegetation at a third wavelength range, wherein the nitrogen status being based upon only green parts of plants exposed to light in the vegetation image.

13. The method of claim 12 wherein the first wavelength range includes near infrared light and the second wavelength range includes red light and the third wavelength range includes green light.

14. The method of claim 13 further comprising the step of:

estimating the nitrogen status for a selected area of the vegetation image by calculating the ratio of the third wavelength measurement to the measurement of the first wavelength band for a selected area of the vegetation image.

15. The method of claim 14 further comprising the steps of:

sensing a reference strip of vegetation having a non-limiting supply of nitrogen;

calculating a reference N reflectance value from the reference strip;

determining the relative nitrogen content as a function of the reference N reflectance value.

16. The method of claim 13 further comprising the steps of:

calculating an average reflective value $G_{avg_n}$ at the third wavelength for a selected area of the vegetation image based on the formula:

$$G_{avg_n} = \frac{\sum G_n(x_c, y_c)}{c_n}$$

wherein $G_n$ designates the reflectance values at the third wavelength for each of the elements ($x_c$, $y_c$) in the vegetation area and $c_n$ is the total number of elements in the vegetation area; and determining the nitrogen content for the selected area of the vegetation image based on the average reflective value.

17. The method of claim 13 wherein the step of separating a vegetation image from the image by analyzing light reflected at a first wavelength range and light reflected at a second wavelength range includes the steps of:

calculating a normalized difference vegetative index (NDVI) by subtracting the red value from the near infrared value and dividing the result from the addition of the red value and the near infrared value for each element of the image;

computing a threshold value based on the NDVI data for each pixel in the image;

comparing the NDVI value of each element with the threshold value;

producing a vegetation image by setting the reflectance values for all three wavelengths of each pixel to zero if the NDVI value of that pixel is below the threshold.

18. The method of claim 17 wherein the threshold value is computed by:

calculating a histogram of the NDVI values for all the pixels in the image; and selecting a point that separates the vegetation from non-vegetation areas.

19. The method of claim 11 further comprising the steps of:

repeating the steps of sensing light reflected from the area and sensing ambient light intensity after a set time interval;

forming a second image based on the detected light at the plurality of wavelength ranges;

separating a second vegetation image from the second image by analyzing light reflected at the first and second wavelength ranges;

determining vegetation growth over the set time interval by comparing the vegetation image with the second vegetation image.

20. The method of claim 11 further comprising the step of determining a vegetation population from the vegetation image.

21. The method of claim 11 further comprising the step of determining positions of individual plants from the vegetation image.

22. The method of claim 11 further comprising the steps of:

storing the vegetation images;

storing location coordinates corresponding with the stored vegetation images; and combining the vegetation image with other vegetation images to form a vegetation map of a larger area.

23. The method of claim 11 further comprising the step of isolating an image of a specific row of vegetation.

24. The imaging system of claim 1 wherein the vegetation includes only a first part of a plant being imaged, and the non-vegetation includes a second part of the plant being imaged.

* * * * *